United States Patent
Ichikawa et al.

[11] Patent Number: 5,824,281
[45] Date of Patent: Oct. 20, 1998

[54] PROCESS FOR PRODUCING SILICON CARBIDE FIBERS

[75] Inventors: Hiroshi Ichikawa, Yokohama; Michio Takeda, Yamato; Junichi Sakamoto; Akinori Saeki, both of Yokohama, all of Japan

[73] Assignee: Nippon Carbon Co., Ltd., Tokyo, Japan

[21] Appl. No.: 650,974

[22] Filed: May 21, 1996

[30] Foreign Application Priority Data

May 22, 1995 [JP] Japan .................................. 7-145138

[51] Int. Cl.$^6$ ...................................................... C01B 31/36
[52] U.S. Cl. ........................................ 423/345; 204/157.45
[58] Field of Search .......................... 423/345; 204/173, 204/164, 157.45, 157.44

[56] References Cited

U.S. PATENT DOCUMENTS

| | | | |
|---|---|---|---|
| 3,758,672 | 9/1973 | Lewis | 423/345 |
| 4,134,759 | 1/1979 | Yajima et al. | 423/345 |
| 4,604,367 | 8/1986 | Takamizawa et al. | 423/345 |
| 4,753,763 | 6/1988 | Tanaka et al. | 264/65 |
| 4,923,716 | 5/1990 | Brown et al. | 423/345 |
| 4,948,762 | 8/1990 | Krumbe et al. | 423/345 |
| 5,021,370 | 6/1991 | Ishikawa et al. | 501/95 |

*Primary Examiner*—Michael L. Lewis
*Assistant Examiner*—Stuart L. Hendrickson
*Attorney, Agent, or Firm*—Bucknam and Archer

[57] ABSTRACT

The present invention provides a process for producing silicon carbide fibers having a C/Si molar ratio of from 0.85 to 1.39 and excellent in heat resistance and strength at high temperatures, while conventional processes have not been able to produce the fibers having the ratio of less than 1.56.

The process of the present invention comprises the steps of rendering infusible precursory fibers made from an organo-silicon polymer compound to obtain infusible fibers, then primarily baking the infusible fibers in a hydrogen gas-containing atmosphere while raising the temperature thereof to obtain primarily baked fibers, and further secondarily baking the primarily baked fibers to obtain final fibers. The secondary baking is performed in the atmosphere of a mixed gas of an inert gas with hydrogen chloride gas at 1,500° to 2,200° C.

4 Claims, No Drawings

PROCESS FOR PRODUCING SILICON CARBIDE FIBERS

BACKGROUND OF THE INVENTION

1. Field of the Invention

According to conventional methods for producing silicon carbide fibers, for example, one described in U.S. Pat. No. 4,100,233, it is impossible to obtain fibers having a C/Si molar ratio of lower than 1.56. Therefore, the fibers obtained by the conventional method involve problems that they are inferior in heat resistance, strength and creep resistance at high temperatures due to excess carbon and oxygen contained in the fibers.

The present invention relates to a process for producing silicon carbide fibers, and more particularly to a process for producing silicon carbide fibers having excellent heat resistance, resistance to oxidation and creep properties particularly at high temperatures, by employing an atmosphere containing hydrogen gas in a primary baking step and an atmosphere containing hydrogen chloride gas in a secondary baking step.

2. Prior Art

According to the conventional methods for producing silicon carbide fibers, for example, one described in U.S. Pat. No. 4,100,233, it is impossible to obtain fibers having a C/Si molar ratio of lower than 1.56. Therefore, the fibers obtained by the conventional method involve problems that they are inferior in heat resistance, strength and creep resistance at high temperatures due to excess carbon and oxygen contained in the fibers.

Silicon carbide fibers have conventionally been produced by spinning polycarbosilane or the like to obtain precursory fibers, rendering infusible the precursory fibers under given conditions, and then baking the infusible precursory fibers in the atmosphere of an inert gas such as nitrogen gas by raising the temperature of the atmosphere. Further, the instant applicant has recently proposed a baking method wherein an atmosphere containing hydrogen gas is employed (e.g., Japanese Pat. Appln. Laid-Open Gazette No. Hei 5-309675 (309675/1993)).

Baking in the atmosphere containing hydrogen gas enables control of the composition, i.e., C/Si molar ratio, of the resulting silicon carbide fibers. However, since grain boundaries between SiC crystals in the above fibers contain a little free silicon, the fibers are notably deteriorated when heat-treated at a high temperature of at least 1,500° C., therefore still unsatisfactory with respect to heat resistance. Accordingly, such conventional silicon carbide fibers involve a problem that they are restricted in their uses at high temperatures.

In recent years, silicon carbide fibers are expected as a material for use in forming various members of a high-temperature gas turbine. However, it is true at present that the conventional silicon carbide fibers still cannot be brought into practical use because of not only the above drawbacks but also insufficiency in resistance to oxidation and creep properties at high temperatures.

SUMMARY OF THE INVENTION

An object of the present invention is to eliminate the above problems of the prior art and provide a process for producing silicon carbide fibers having not only high strength and elastic modulus particularly at high temperatures but also excellent resistance to oxidation and creep properties at high temperatures.

The inventors made intensive studies with a view to attaining the above object. As a result, they have found that the above object can be attained by applying a secondary baking step wherein an atmosphere containing hydrogen chloride gas is employed as the baking atmosphere, in addition to the conventional baking step. The present invention has been completed based on the above finding.

More specifically, the present invention resides in a process for producing silicon carbide fibers, comprising the steps of rendering infusible precursory fibers made from an organosilicon polymer compound to obtain infusible fibers, then primarily baking the infusible fibers in a hydrogen gas-containing atmosphere while raising the temperature thereof to obtain primarily baked fibers, and further secondarily baking the primarily baked fibers to obtain final fibers, the process being characterized in that the secondary baking is performed in the atmosphere of a mixed gas of an inert gas represented by nitrogen gas with hydrogen chloride gas at 1,500° to 2,200° C.

The process of the present invention will now be described below in greater detail.

In the process of the present invention, precursory fibers obtained by spinning an organosilicon polymer compound are used. The organosilicon polymer compounds used as the starting materials include polycarbosilane, polysilazane and polysiloxane. Further, the above organosilicon polymer compounds may be those comprising carbon, silicon, oxygen and nitrogen together with a metallic element such as boron, titanium, zirconium and/or aluminum. Polycarbosilane fibers are generally employed as the precursory fibers for the silicon carbide fibers.

The above organosilicon polymer compound is formed into fibers according to a conventional spinning technique, such as a melt or dry spinning technique to obtain precursory fibers which are subsequently rendered infusible. Methods for rendering the precursory fibers infusible may be conventional ones such as one in which a chemical reaction with oxygen, an oxide, an unsaturated hydrocarbon compound or the like is utilized, or one in which a crosslinking reaction is effected by the use of radiation such as electron beams or ultraviolet rays. Conditions for rendering the fibers infusible, such as atmosphere, temperature, time and actual procedure, may appropriately be selected depending on the employed method of rendering the fibers infusible.

The fibers thus rendered infusible are then primarily baked by raising the temperature of the atmosphere.

The primary baking in the hydrogen gas-containing atmosphere in this invention may be performed according to any one of the following methods:

One method is one wherein the primary baking is performed in an atmosphere in which hydrogen gas is mixed with an inert gas such as nitrogen gas, argon gas or helium gas. The hydrogen gas content of this mixed gas atmosphere may be at least 10 vol. % and most suitably 50 to 70 vol. %.

An alternative method is one wherein the primary baking is started in the atmosphere of pure hydrogen gas and which is changed over to the atmosphere of the above-described inert gas such as nitrogen gas in the middle of temperature rise. It is requisite to conduct the changeover to the inert gas atmosphere at a temperature of not lower than 500° C. This changeover is conducted preferably at a temperature from 650° to 1200° C., more preferably at 700° to 950° C. In a case where this changeover is carried out at a temperature of lower than 500° C., the decarbonization reaction occurs only to a very limited extent thereby to cause a large amount of surplus carbon to remain in the resultant silicon carbide fibers. In the inert gas atmosphere changed over to, the primary baking temperature is raised to the highest temperature of preferably 1,200° to 1,300° C., which is further maintained for a certain time as required to complete the baking.

Baking conditions such as baking time and temperature-raising rate in the primary baking step are not particularly limited and suitably selected from among the conventional conditions. The temperature-raising rate is preferably in the range of 10° to 1,000° C./hr.

In the present invention, good results can be obtained using either of the above methods. Additionally stated, there may be employed another alternative method wherein the primary baking is performed only in the atmosphere of hydrogen gas throughout the primary baking step.

The employment of a hydrogen gas-containing atmosphere having reducing activity in the primary baking step advances the pyrolysis and decarbonization or the precursory fibers, with the result that it ensures control of the chemical composition of the resultant primarily baked fibers, i.e., restriction of the amount of excess carbon generated.

In the primary baking step, particular conditions such as the time and temperature range for holding the infusible fibers in a hydrogen gas-containing atmosphere may be appropriately selected so that the C/Si molar ratio of the resultant primarily baked fibers is preferably 1.35 or less and more preferably 1.10 or less, depending on the amount of infusible fibers fed, the concentration of hydrogen gas used and other factors.

Finally, the primarily baked fibers thus obtained are secondarily baked in the atmosphere of the mixed gas of an inert gas represented by nitrogen gas with hydrogen chloride gas, so that free silicon is removed from the surfaces of the fibers, thereby to obtain silicon carbide fibers having a C/Si molar ratio of from 0.85 to 1.39.

The mixing proportion of hydrogen chloride gas to the inert gas represented by nitrogen gas is preferably set in the range of 0.1 to 30 vol. %. The secondary baking is preferably performed at an arbitrary temperature between 1,500° to 2,200° C. On the other hand, the secondary baking time may be at least 10 seconds.

The secondary baking may also be performed according to a batch process instead of the foregoing continuous process. More specifically, the secondary baking may be effected over several hours while increasing the hydrogen chloride gas concentration in the secondary baking atmosphere together with raising temperature. In this case, the temperature is lowered after the secondary baking to complete the production of silicon carbide fibers.

It is believed that the foregoing secondary baking at such a high temperature(s) enables free silicon present in grain boundaries to ooze out or vaporize over the surfaces of the fibers and then the silicon reacts with hydrogen chloride contained in the atmosphere to form silicon chloride, thereby the free silicon is removed. Due to the foregoing effect, the resulting silicon carbide fibers are little deteriorated even when heat-treated at a high temperature. A halogen gas such as chlorine gas may be used instead of hydrogen chloride gas to bring about a similar reaction.

Thus, silicon carbide fibers having high elastic modulus and excellent heat resistance as well as excellent resistance to oxidation and creep properties at high temperatures can be obtained by introducing the step of secondary baking in an atmosphere containing hydrogen chloride.

DESCRIPTION OF THE PREFERRED EMBODIMENTS

The present invention will be described below in greater detail with reference to the following Examples.

Example 1 and Comparative Examples 1 to 2

The polycarbosilane having the following basic skeletone and the average molecular-weight of about 2,000 was melt-spun to obtain precursory fibers having diameters of 12 to 14 μm.

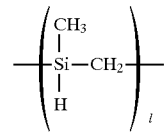

In the above basic skeleton, l represents integer.

The obtained precursory fibers were rendered infusible by the respective methods specified in Table 1 to obtain infusible fibers. The conditions under which the precursory fibers were rendered infusible were as follows:

(Rendering the fibers infusible by electron beams)
Atmosphere: He
Electron beam acceleration voltage: 2 MeV
Electron beam current :3 mA
Irradiation time: 10 hr
(Rendering the fibers infusible by $O_2$)
Atmosphere: air
Temperature-raising rate: 10° C./hr
Highest temperature 200° C.

The thus obtained infusible fibers were primarily baked by raising the temperature thereof to 1300° C. under the respective conditions specified in Table 1 thereby to obtain primarily baked fibers. The baking temperature was raised at a rate of 100° C./hr.

Last of all, the obtained primarily baked fibers were secondarily baked under the respective conditions specified in Table 1 to obtain silicon carbide fibers.

The C/Si molar ratio, tensile strength and tensile elastic modulus of the obtained silicon carbide fibers are shown in Table 1.

TABLE 1

| Example & Comp. Ex. | Method for rendering fibers infusible | Temp. & Atm. in primary baking | Temp. Time and Atm. in secondary baking | C/Si (molar ratio) | Tensile strength (GPa) | Tensile elastic modulus (GPa) |
| --- | --- | --- | --- | --- | --- | --- |
| Comp. Ex. 1 | $O_2$ | Room temp. ~ 1300° C. $N_2$ gas | — | 1.31 | 3.0 | 220 |
| Comp. Ex. 2 | Electron beam | Room temp. ~ 700° C. $H_2$ gas 700° C. ~ 1300° C. $N_2$ gas | $N_2$ gas 1500° C. 10 sec. | 1.39 | 2.8 | 270 |
| Example 1 | Electron beam | Room temp. ~ 800° C. | $N_2$/HCl = 10/0.3 | 1.05 | 2.6 | 420 |

TABLE 1-continued

| Example & Comp. Ex. | Method for rendering fibers infusible | Temp. & Atm. in primary baking | Temp. Time and Atm. in secondary baking | C/Si (molar ratio) | Tensile strength (GPa) | Tensile elastic modulus (GPa) |
|---|---|---|---|---|---|---|
| | | $H_2$ gas 800° C. ~ 1300° C. Ar gas | (vol./vol.) 1800° C. 10 sec. | | | |

It is clear from Table 1 that the silicon carbide fibers of Example 1 produced by using the hydrogen chloride gas-containing atmosphere as the secondary baking atmosphere had a high tensile elastic modulus as compared with those of Comparative Examples 1 and 2.

Subsequently, the silicon carbide fibers thus obtained in Example 1 and Comparative Examples 1 and 2 were individually subjected to a heat resistance test, an oxidation resistance test and a high-temperature creep resistance test according to the following methods. The results are shown in Table 2.

[Heat resistance test]

Silicon carbide fibers of each Example were exposed to an argon gas atmosphere at a temperature of 1,800° C. for 1 hour, then measured for tensile strength.

[Oxidation resistance test]

Silicon carbide fibers of each Example were exposed to air at a temperature of 1,400° C. for 10 hours, then measured for tensile strength. The ratio of this tensile strength to the original tensile strength before the test was calculated to evaluate the resistance thereof to oxidation.

[High-temperature creep resistance test]

Silicon carbide fibers of each Example were tested for high-temperature creep resistance by exposing to argon gas atmosphere at a temperature of 1,200° C. for 1 hour to find a stress relaxation ratio.

hydrogen chloride-containing atmosphere. The silicon carbide fibers of Example 1, though slightly poorer in the original tensile strength than those of Comparative Examples 1 and 2 as shown in Table 1, exhibited a higher tensile strength after the oxidation resistance test and hence a higher ratio of after-test strength to before-test strength than those of Comparative Examples 1 and 2.

Thus, it was confirmed that the silicon carbide fibers produced according to the process of the present invention can be satisfactorily used in air at about 1,400° C. and can be satisfactorily endurable for use in an inert atmosphere even at a high temperature of about 1,800° C.

Examples 2 to 4 and Comparative Example 3

The same polycarbosilane as used in Example 1 was used as a starting material, and rendering fibers infusible and primary baking steps were performed according to the following common conditions specified in <1> and <2> below. The primarily baked fibers of each Example were then secondarily baked at 1,800° C. for 10 seconds with the different mixing proportion of hydrogen chloride gas in the atmosphere from each other as specified in Table 3. The properties of the resulting silicon carbide fibers are shown in Table 3.

<1> Rendering fibers infusible: rendering fibers infusible by electron beams.

TABLE 2

| Example & Comp. Ex. | Tensile strength after heat resistance test | Tensile strength (ratio) after oxidation resistance test | | Stress relaxation ratio in high-temp. creep resistance test |
|---|---|---|---|---|
| | | strength (GPa) | Strength ratio of after to before test (%) | |
| Comp. Ex. 1 | 0 | 0.9 | 27 | 0.20 |
| Comp. Ex. 2 | 1.1 | 1.2 | 35 | 0.62 |
| Example 1 | 1.91 | 1.8 | 60 | 0.92 |

It was understood from Table 2 that the silicon carbide fibers of Example 1 produced by using the hydrogen chloride gas-containing atmosphere in the secondary baking were excellent in heat resistance, resistance to oxidation and high-temperature creep resistance as compared with those of Comparative Examples 1 and 2 produced by using no <2> Primary Baking: baking in a hydrogen gas atmosphere from room temperature to 800° C. and in an argon gas atmosphere from 800° C. to 1,300° C. (C/Si ratio after primary baking was 1.04).

Additionally stated, the other particular conditions were the same as in Example 1.

TABLE 3

| Example & Comp. Ex. | $N_2$/HCl (vol./vol.) | Appearance | Tensile Strength (GPa) | Tensile elastic modulus (GPa) | Tensile strength & Tensile elastic modulus after heat resistance test in Ar gas (GPa) | | |
|---|---|---|---|---|---|---|---|
| | | | | | 1800° C. −1 Hr | 1800° C. −10 Hr | 2000° C. −1 Hr |
| Comp. Ex. 3 | 10/0 | grayish black | 0 | — | — | — | — |
| Example 2 | 10/0.1 | black, glossy ~ gray | 2.22 | 417 | 0 | — | — |

TABLE 3-continued

| Example & Comp. Ex. | N$_2$/HCl (vol./vol.) | Appearance | Tensile Strength (GPa) | Tensile elastic modulus (GPa) | Tensile strength & Tensile elastic modulus after heat resistance test in Ar gas (GPa) | | |
|---|---|---|---|---|---|---|---|
| | | | | | 1800° C. −1 Hr | 1800° C. −10 Hr | 2000° C. −1 Hr |
| Example 3 | 10/0.3 | blackish brown, glossy | 2.62 | 404 | 0 | 0 | 0 |
| Example 4 | 10/1 | blackish purple, glossy | 3.15 | 425 | 1.61 & 390 | 1.05 & 350 | 1.07 & 340 |

* Symbol "—" denotes unmeasurableness due to deterioration of fibers.

Table 3 shows that the silicon carbide fibers of Comparative Example 3 produced by secondary baking in no hydrogen chloride gas-containing atmosphere were notably deteriorated in strength. On the other hand, the silicon carbide fibers of Examples 2 to 4, which were respectively produced by secondary baking in a hydrogen chloride gas-containing atmosphere exhibited higher tensile strength and tensile elastic modulus as increasing the hydrogen chloride gas concentration in the atmosphere when the proportion of hydrogen chloride gas to nitrogen gas was in the range of 1 to 10 vol. %. Further, in the case of Example 4 where the proportion of hydrogen chloride gas to nitrogen gas was 10 vol. %, the resulting silicon carbide fibers exhibited excellent heat resistance even at 1,800° C. or higher.

Examples 5 to 7 and Comparative Examples 4 to 6

The same polycarbosilane as used in Example 1 was melt-spun, and the resulting precursory fibers were then rendered infusible and primarily baked under the respective conditions specified in Table 4. Additionally stated, the other conditions were the same as in Example 1. Subsequently, the resulting primarily baked fibers were secondarily baked in the respective atmosphere and at respective specified in Table 4 for 10 seconds.

Silicon carbide fibers produced by the secondary baking in the different at the different temperature were compared with one another in respect of appearance. The results are shown in Table 4. It should be noted in Table 4 that an atmosphere of nitrogen gas alone was used in all Comparative Examples, while an atmosphere containing hydrogen chloride gas in amount of 10 vol. % based on nitrogen gas was used in all Examples. Further, Comparative Examples 4 to 6 respectively correspond to Examples 5 to 7 in with respect to secondary baking temperature. Additionally stated, symbols ○, Δ and X in Table 4 denote the qualitative strengths of fibers, and ○ for good, Δ for slightly weak and X for brittle and weak.

TABLE 4

| Method for producing primarily baked fibers, C/Si Ratio | | | Comp. Ex. 4 | Comp. Ex. 5 | Comp. Ex. 6 | Ex. 5 | Ex. 6 | Ex. 7 |
|---|---|---|---|---|---|---|---|---|
| Method for rendering fibers infusible | Primary baking temperature and atmosphere | C/Si | N$_2$ gas atmosphere | | | N$_2$/HCl = 10/1 (vol./vol.) | | |
| | | | 1800° C. | 2000° C. | 2200° C. | 1800° C. | 2000° C. | 2200° C. |
| Electron beam | Room temp. ~ 700° C. H$_2$ gas 700° C. ~ 1300° C. N$_2$ gas | 1.39 | ○ black, glossy | ○ black, glossy | ○ black, glossy | ○ slightly brownish black, glossy | ○ slightly brownish black, glossy | ○ slightly brownish black, glossy |
| Electron beam | Room temp. ~ 800° C. H$_2$ gas 800° C. ~ 1300° C. Ar gas | 1.05 | X grayish black | X | X | ○ slightly brownish black, glossy | ○ slightly brownish black, glossy | ○ slightly brownish black, glossy |
| Electron beam | Room temp. ~ 900° C. H$_2$ gas 900° C. ~ 1300° C. Ar gas | 0.85 | X grayish black | X | X | ○ blackish brown | — | — |
| O$_2$ | Room temp. ~ 1300° C. N$_2$ gas | 1.31 | X brownish green | X brownish green | X brownish green | ○ black | Δ partly discolored | X black, brittle |

*Symbol "—" denotes unobservableness due to deterioration of fibers.

The mixing effect of hydrogen chloride gas in the secondary baking atmosphere can be clearly recognized from Table 4. All silicon carbide fibers of Comparative Example 4 wherein secondary bakings had been performed in a nitrogen atmosphere at 1,800° C. were notably deteriorated except the fiber on uppermost column of the Table, while the fibers obtained in Example 5 were all good black to brown wherein secondary bakings had been performed at the same temperature as Comparative Example 4 but hydrogen chloride gases had been mixed in the secondary baking atmosphere. In the case of the primarily baked fibers having C/Si of 1.39 or 1.05, good fibers were obtained by secondary baking even at a high temperature of either 2,000° C. or 2,200° C. in Examples 6 and 7 wherein hydrogen chloride gases were mixed in the secondary baking atmosphere. This is believed to be due to the fact that free silicon present in grain boundaries was removed by reacting with hydrogen chloride to form silicon chloride. However, fibers produced by secondary baking at 2,000° C. or higher were slightly inferior in strength.

As described hereinbefore, silicon carbide fibers having not only high strength and elastic modulus even at high temperatures but also excellent resistance to oxidation and creep properties at high temperatures can be obtained according to the process of the present invention.

What is claimed is:

1. A process for producing silicon carbide fibers having tensile strength in GPA between 2.22 and 3.15 and tensile elastic modulus in GPA 404–425 having a C/Si molar ratio of from 0.85 to 1.39, comprising the steps of:

1) spinning an organosilicon polymer compound which is a member selected from the group consisting of a polycarbosilane, to obtain precursor fibers;
   2) irradiating said precursor fibers with an electron beam whereby infusible fibers are obtained;
   3) subjecting said infusible precursor fibers from step 2) to a primary baking step in a hydrogen gas by heating up to 1200°–1300° C. to obtain primarily baked fibers wherein said primary baking step is carried out initially with hydrogen gas and when the temperature has reached 700°–950° C., said primary baking step is carried out only with an inert gas;
   4) then subjecting said primarily baked fibers from step 3) to a secondary baking step, said secondary baking step being performed in an atmosphere of a mixed gas of an inert gas with hydrogen chloride gas at 1,500° to 2,200° C.

2. The process according to claim 1 wherein the secondary baking is performed at least 10 seconds.

3. The process according to claim 1 wherein said primary baking step is carried out at a heating rate of 10°–1000° C. per hour.

4. The process according to claim 1 wherein in said secondary baking step the proportion of hydrogen chloride gas to said inert gas in said mixed gas is 0.1 to 30 vol. %.

* * * * *